(12) United States Patent
Chari et al.

(10) Patent No.: US 10,944,560 B2
(45) Date of Patent: Mar. 9, 2021

(54) PRIVACY-PRESERVING IDENTITY ASSET EXCHANGE

(71) Applicant: International Business Machines Corporation, Armonk, NY (US)

(72) Inventors: Suresh N. Chari, Scarsdale, NY (US); Hasini Gunasinghe, West Lafayette, IN (US); Ashish Kundu, Elmsford, NY (US); Kapil Kumar Singh, Cary, NC (US); Dong Su, Elmsford, NY (US)

(73) Assignee: International Business Machines Corporation, Armonk, NY (US)

( * ) Notice: Subject to any disclaimer, the term of this patent is extended or adjusted under 35 U.S.C. 154(b) by 135 days.

(21) Appl. No.: 16/053,189

(22) Filed: Aug. 2, 2018

(65) Prior Publication Data

US 2020/0044848 A1 Feb. 6, 2020

(51) Int. Cl.
*H04L 9/32* (2006.01)
*H04L 29/06* (2006.01)
*H04L 9/30* (2006.01)

(52) U.S. Cl.
CPC .......... *H04L 9/321* (2013.01); *H04L 63/0421* (2013.01); *H04L 9/30* (2013.01); *H04L 2209/38* (2013.01); *H04L 2209/42* (2013.01)

(58) Field of Classification Search
CPC ...... G06F 21/10; G06F 21/105; G06F 21/645; G06F 2221/0753; G06F 2221/0788; G06Q 2220/18; H04L 2209/38; H04L 9/30; H04L 9/3236; H04L 9/3242; H04L 9/3247
See application file for complete search history.

(56) References Cited

U.S. PATENT DOCUMENTS

| 9,635,000 B1* | 4/2017 | Muftic | H04L 9/3239 |
| 2015/0081567 A1* | 3/2015 | Boyle | G06Q 20/02 |
| | | | 705/71 |
| 2016/0342978 A1* | 11/2016 | Davis | G06Q 20/40 |
| 2017/0046806 A1* | 2/2017 | Haldenby | G06F 21/645 |

(Continued)

OTHER PUBLICATIONS

P. Mell et al., "The NIST Definition of Cloud Computing", National Institute of Standards and Technology, Information Technology Laboratory, Sep. 2011, pp. 1-7.

(Continued)

*Primary Examiner* — Joseph P Hirl
*Assistant Examiner* — Sayed Aresh Beheshti Shirazi
(74) *Attorney, Agent, or Firm* — Law Office of Jim Boice

(57) ABSTRACT

A processor-implemented method facilitates identity exchange in a decentralized setting. A first system performs a pseudonymous handshake with a second system that has created an identity asset that identifies an entity. The second system has transmitted the identity asset to a third system, which is a set of peer computers that support a blockchain that securely maintains a ledger of the identity asset. The first system transmits a set of pseudonyms to the third system, where the set of pseudonyms comprises a first pseudonym that identifies the first system, a second pseudonym that identifies a user of the second system, and a third pseudonym that identifies the third system. The first system receives the identity asset from the third system, which securely ensures a validity of the identity asset as identified by the first pseudonym, the second pseudonym, and the third pseudonym.

20 Claims, 18 Drawing Sheets

(56) References Cited

U.S. PATENT DOCUMENTS

| | | | | |
|---|---|---|---|---|
| 2017/0083860 | A1* | 3/2017 | Sriram | H04L 63/0823 |
| 2017/0329980 | A1* | 11/2017 | Hu | G06F 21/78 |
| 2017/0346833 | A1* | 11/2017 | Zhang | H04L 63/123 |
| 2018/0060496 | A1* | 3/2018 | Bulleit | H04L 9/3239 |
| 2019/0028277 | A1* | 1/2019 | Jayachandran | H04L 9/085 |
| 2019/0036957 | A1* | 1/2019 | Smith | H04L 63/101 |
| 2019/0095909 | A1* | 3/2019 | Wright | G06Q 20/02 |
| 2019/0165943 | A1* | 5/2019 | Chari | H04L 9/3221 |
| 2019/0182035 | A1* | 6/2019 | Chari | H04L 9/083 |
| 2019/0268284 | A1* | 8/2019 | Karame | H04L 9/3236 |
| 2019/0278916 | A1* | 9/2019 | Lum | H04L 9/0894 |
| 2019/0295162 | A1* | 9/2019 | Wang | H04L 9/0866 |
| 2019/0318063 | A1* | 10/2019 | Wierzba | H04L 9/30 |

OTHER PUBLICATIONS

L. Brandao et al., "Toward Mending Two Nation-Scale Brokered Identification Systems", Proceedings on Privacy Enhancing Technologies, De Gruyter, 2015, pp. 135-155.

Securekey Technologies Inc., "About Securekey", <https://securekey.com/about-securekey/>, Retrieved Aug. 2, 2018, pp. 1-4.

IBM Research Zurich, "Identity Mixer", <https://www.zurich.ibm.com/identity_mixer/>, Retrieved Aug. 2, 2018, pp. 1-16.

Openid, "Welcome to Openid Connect", <http://openid.net/connect/>, Retrieved Aug. 2, 2018, pp. 1-4.

\* cited by examiner

| USE CASE | SAMPLE IDENTITY VERIFICATION/ DUE DILIGENCE CHECKLIST |
|---|---|
| 1. CONSUMING FINANCIAL SERVICES OFFERED BY A BANK | - PRIMARY IDENTITY (E.G. PASSPORT)<br>- PROOF OF FINANCIAL ELIGIBILITY<br>- PROOF OF ADDRESS<br>- STATUS OF: ANTI-MONEY-LAUNDERING (AML), COUNTER-TERRORIST FINANCING (CTF) AND POLITICALLY EXPOSED PERSON (PEP) [1]. |
| 2. JOINING A NEW EMPLOYMENT BY AN INTERNATIONAL GRADUATE | - PRIMARY IDENTITY (E.G: PASSPORT)<br>- VISA STATUS (I-20)<br>- ARRIVAL-DEPARTURE RECORDS (I-94)<br>- EMPLOYMENT ELIGIBILITY (SSN)<br>- EMPLOYMENT HISTORY FOR 5 YEARS, EDUCATIONAL HISTORY<br>- BACKGROUND INVESTIGATION REPORT |
| 3. APPLYING FOR TEMPORARY VISA IN A FOREIGN COUNTRY | - PASSPORT<br>- PROOF OF CITIZENSHIP<br>- PROOFS OF ASSETS AND BONDS IN THE ONES OWN COUNTRY |

FIG. 2

PRIVACY-PRESERVING IDENTITY ASSET EXCHANGE

BACKGROUND

The present invention relates to the field of blockchains, and particularly to blockchains that support the exchange of identity assets. Still more particularly, the present invention relates to improving blockchains' confidentiality during the exchange of identity assets.

SUMMARY

In one or more embodiments of the present invention, a processor-implemented method facilitates identity exchange in a decentralized setting. A first system performs a pseudonymous handshake with a second system that has created an identity asset that identifies an entity. The second system has transmitted the identity asset to a third system, which is a set of peer computers that support a blockchain that securely maintains a ledger of the identity asset. The first system transmits a set of pseudonyms to the third system, where the set of pseudonyms comprises a first pseudonym that identifies the first system, a second pseudonym that identifies a user of the second system, and a third pseudonym that identifies the third system. The first system receives the identity asset from the third system, which securely ensures a validity of the identity asset as identified by the first pseudonym, the second pseudonym, and the third pseudonym.

The described inventions may also be implemented in a computer system and/or as a computer program product.

BRIEF DESCRIPTION OF THE DRAWINGS

FIG. 2 illustrates exemplary scenarios and associated sample identity verifications and due diligence checklists in accordance with one or more embodiments of the present invention;

DETAILED DESCRIPTION

Figure 1:
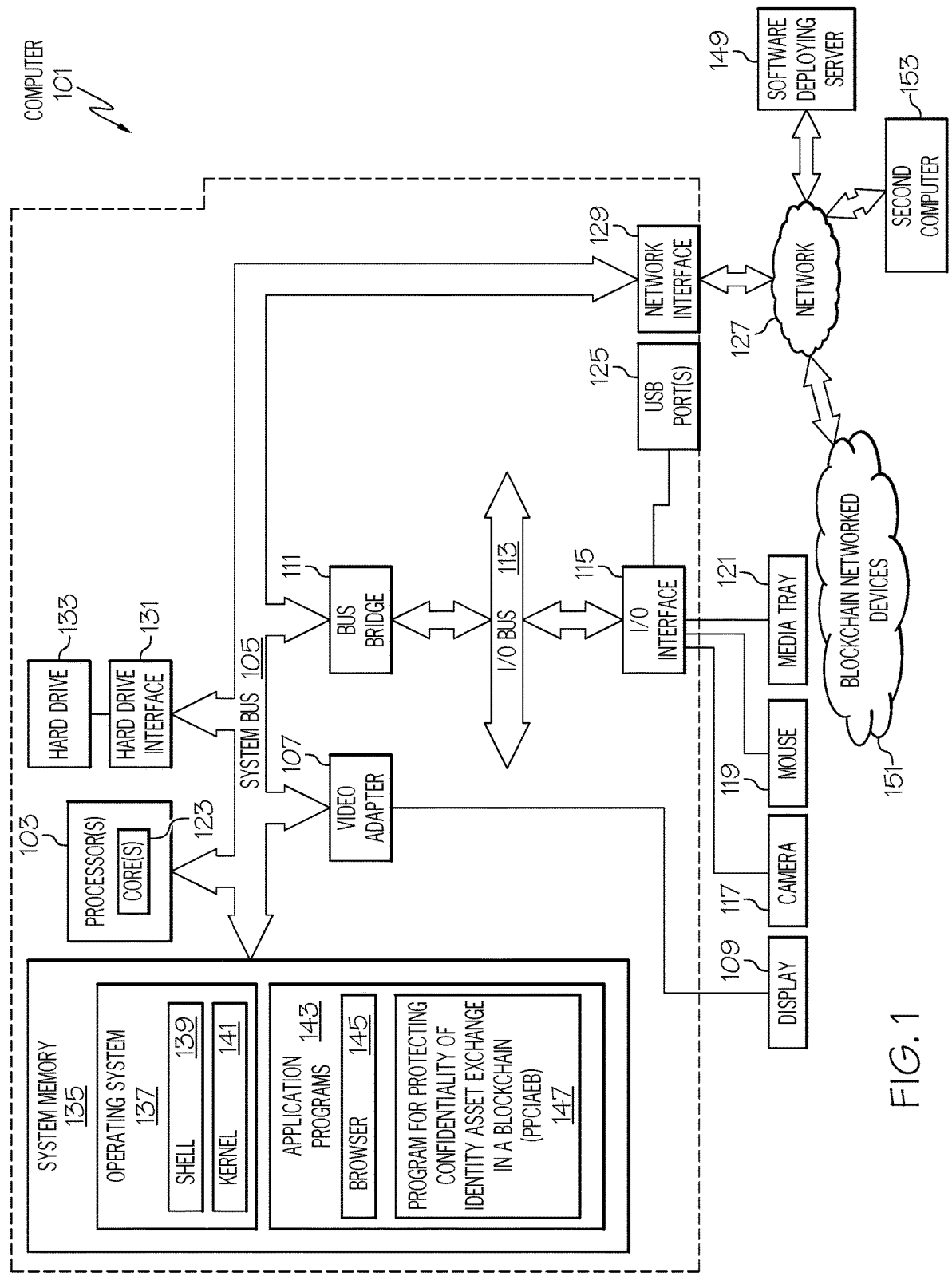
FIG. 1 depicts an exemplary system and network that is used in one or more embodiments of the present invention.

In one or more embodiments, the present invention is a system, a method, and/or a computer program product at any possible technical detail level of integration. In one or more embodiments, the computer program product includes a computer readable storage medium (or media) having computer readable program instructions thereon for causing a processor to carry out aspects of the present invention.

The computer readable storage medium is a tangible device that is able to retain and store instructions for use by an instruction execution device. In one or more embodiments, the computer is, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein are capable of being downloaded to respective computing/processing devices from a computer readable storage medium or to an external computer or external storage device via a network, for example, the Internet, a local area network, a wide area network and/or a wireless network. In one or more embodiments, the network comprises copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

In one or more embodiments, computer readable program instructions for carrying out operations of the present invention comprise assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. In one or more embodiments, the computer readable program instructions execute entirely on the user's computer, partly on the user's computer, as a stand-alone software package, partly on the user's computer and partly on a remote computer or entirely on the remote computer or server. In the latter scenario and in one or more embodiments, the remote computer connected to the user's computer through any type of network, including a local area network (LAN) or a wide area network (WAN), or the connection is made to an external computer (for example, through the Internet using an Internet Service Provider). In some embodiments, electronic circuitry including, for example, programmable logic circuitry, field-programmable gate arrays (FPGA), or programmable logic arrays (PLA) execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, are implemented by computer readable program instructions in one or more embodiments of the present invention.

In one or more embodiments, these computer readable program instructions are provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. In one or more embodiments, these computer readable program instructions are also be stored in a computer readable storage medium that, in one or more embodiments, direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

In one or more embodiments, the computer readable program instructions are also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams represents a module, segment, or portion of instructions, which comprises one or more executable instructions for implementing the specified logical function(s). In some alternative implementations, the functions noted in the block occur out of the order noted in the figures. For example, two blocks shown in succession are, in fact, executed substantially concurrently, or the blocks are sometimes executed in the reverse order, depending upon the functionality involved. It will also be noted that, in one or more embodiments of the present invention, each block of the block diagrams and/or flowchart illustration, and combinations of blocks in the block diagrams and/or flowchart illustration, are implemented by special purpose hardware-based systems that perform the specified functions or acts or carry out combinations of special purpose hardware and computer instructions.

With reference now to the figures, and in particular to FIG. 1, there is depicted a block diagram of an exemplary system and network that are utilized in the one or more embodiments of the present invention. In accordance with various embodiments of the present invention, some or all of the exemplary architecture, including both depicted hardware and software, shown for and within computer 101 utilized by software deploying server 149 and/or devices within a network of blockchain networked device 151 and/or second computer 153 shown in FIG. 1.

In one or more embodiments of the present invention, exemplary computer 101 includes a processor 103 that is coupled to a system bus 105. Processor 103 utilizes one or more processors, each of which has one or more processor cores 123. A video adapter 107, which drives/supports a display 109 (which in one embodiment is a touch-screen display capable of detecting touch inputs onto the display 109), is also coupled to system bus 105. System bus 105 is coupled via a bus bridge 111 to an input/output (I/O) bus 113. An I/O interface 115 is coupled to I/O bus 113. I/O interface 115 affords communication with various I/O devices, including a keyboard 117, a mouse 119, a media tray 121 (which in one embodiment includes storage devices such as CD-ROM drives, multi-media interfaces, etc.), and external USB port(s) 125. While the format of the ports connected to I/O interface 115 is that which is known to those skilled in the art of computer architecture, including by not limited to universal serial bus (USB) ports.

As depicted, computer 101 is able to communicate with a software deploying server 149 and/or other devices/systems using a network interface 129. Network interface 129 is a hardware network interface, such as a network interface card (NIC), etc. In one or more embodiments, network 127 is an external network such as the Internet, or an internal network such as an Ethernet or a virtual private network (VPN). In one or more embodiments, network 127 is a wireless network, such as a Wi-Fi network, a cellular network, etc. As such, computer 101 and/or blockchain networked devices 151 and/or second computer 153 are devices capable of transmitting and/or receiving wireless and/or Internet broadcasts, such as private/public channel radio or television broadcasts, streaming broadcasts, etc.

A hard drive interface 131 is also coupled to system bus 105. Hard drive interface 131 interfaces with a hard drive 133. In one embodiment, hard drive 133 populates a system memory 135, which is also coupled to system bus 105.

System memory is defined as a lowest level of volatile memory in computer 101. This volatile memory includes additional higher levels of volatile memory (not shown), including, but not limited to, cache memory, registers and buffers. Data that populates system memory 135 includes computer 101's operating system (OS) 137 and application programs 143.

OS 137 includes a shell 139, for providing transparent user access to resources such as application programs 143. Generally, shell 139 is a program that provides an interpreter and an interface between the user and the operating system. More specifically, shell 139 executes commands that are entered into a command line user interface or from a file. Thus, shell 139, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 141) for processing. While shell 139 is a text-based, line-oriented user interface, the present invention will equally well support other user interface modes, such as graphical, voice, gestural, etc.

As depicted, OS 137 also includes kernel 141, which includes lower levels of functionality for OS 137, including providing essential services required by other parts of OS 137 and application programs 143, including memory management, process and task management, disk management, and mouse and keyboard management.

Application programs 143 include a renderer, shown in exemplary manner as a browser 145. Browser 145 includes program modules and instructions enabling a world wide web (WWW) client (i.e., computer 101) to send and receive network messages to the Internet using hypertext transfer protocol (HTTP) messaging, thus enabling communication with software deploying server 149 and other systems.

Application programs 143 in computer 101's system memory (as well as software deploying server 149's system memory) also include a Program for Protecting Confidentiality of Identity Asset Exchange in a Blockchain (PPCIAEB) 147. PPCIAEB 147 includes code for implementing the processes described below, including those described in FIGS. 2-16. In one embodiment, computer 101 is able to download PPCIAEB 147 from software deploying server 149, including in an on-demand basis, wherein the code in PPCIAEB 147 is not downloaded until needed for execution. In one embodiment of the present invention, software deploying server 149 performs all of the functions associated with the present invention (including execution of PPCIAEB 147), thus freeing computer 101 from having to use its own internal computing resources to execute PPCIAEB 147.

The hardware elements depicted in computer 101 are not intended to be exhaustive, but rather are representative to highlight essential components required by the present invention. For instance, in one or more embodiments computer 101 includes alternate memory storage devices such as magnetic cassettes, digital versatile disks (DVDs), Bernoulli cartridges, and the like. These and other variations are intended to be within the spirit and scope of the present invention.

An identity (also referred to herein as a digital asset, an identity asset, and a digital identity asset) is defined as digital information that is about a user and that identifies the user. An identity is made up of attributes. Examples of attributes that make up an identity include, but are not limited to, financial information about the user, employment information about the user, commercial information about the user, etc. Identities that describe users can be shared between parties in a digital identity ecosystem (e.g., identity providers and identity consumers), but only after the users (including the entity that is described by the identity— digital identity asset) expressly provide their permission to do so.

In one or more embodiments, the present invention is utilized in an identity ecosystem that is operated on a trusted and decentralized identity platform backed by blockchain technology, as described herein.

Users acquire services from different service providers on a day-to-day basis. Examples of such services include, but are not limited to, acquiring a bank loan, buying real or personal property, gaining employment, acquiring a temporary travel/work visa, etc. In order to obtain such a service/product/job, a user needs to provide proper identification to the entity that is providing the service/product/job. Thus, access to such services is controlled by various identity verification processes. Some of these identity verification processes not only ask for individual pieces of identity information of a user such as email address, Social Security Number, passport number etc., but also require the user to go through certain due diligence processes in order to fulfill certain compliance requirements, such as Know Your Customer (KYC) compliance in the banking/financial sector, as well as to get to know the customer better.

As described herein and in one or more embodiments of the present invention, the identity provider and the identity consumer exchange digital identity assets of a user that approves of the exchange. As part of digital identity management and in accordance with one or more embodiments of the present invention, this exchange of identity information is anonymous. That is, the identity provider (that provides the identity) and the identity consumer (that uses/consumes the identity) stay anonymous to each other as well as to any party observing the transaction, except the user whose identity being exchanged.

Example scenarios and a sample identity verification and due diligence checklist associated with them are shown in Table 202 in FIG. 2, which shows example scenarios and associated sample identity verifications and due diligence checklists.

In the scenarios shown in Table 202, users must produce the required proofs of documents, fill out lengthy forms, visit the verifier in-person and wait for a considerable amount of time for the verification to go through. On the other hand, service providers also spend time and resources in performing these identity verification and due diligence steps. Once these identity verification/due diligence steps are performed with regard to a particular individual, the packages of information that result from such processes become the service providers' assets, which are referred to herein as identity assets.

Figure 3:
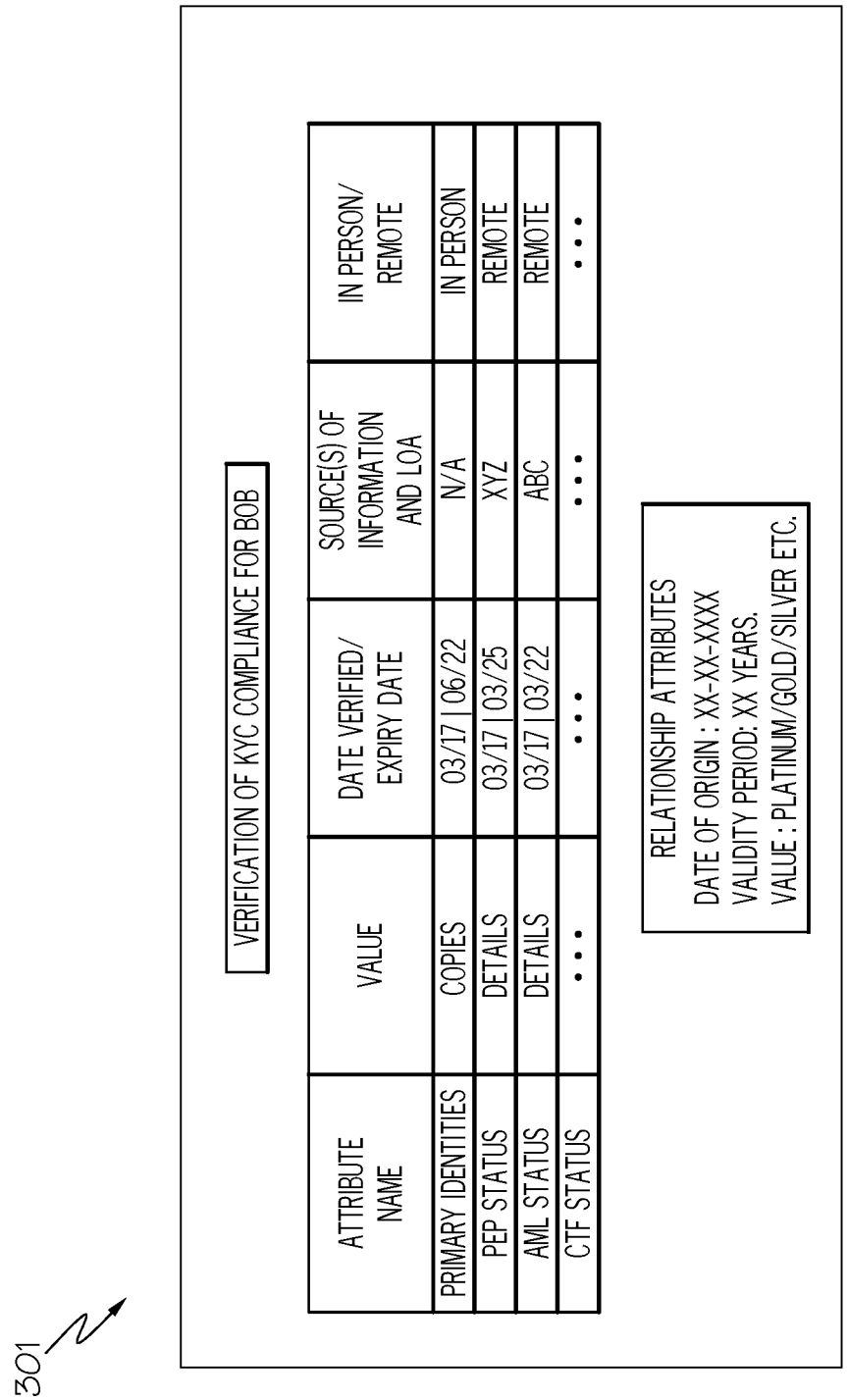
FIG. 3 depicts an exemplary identity asset in accordance with one or more embodiments of the present invention.

Examples of such identity assets are shown in FIG. 3 as exemplary identity asset 301, which is part of a Know Your Customer (KYC) verification for a user named "Bob", as required in Use Case 1 in Table 202 from FIG. 2. That is, banks are required to know the identity of a party for whom they are providing a service, in order to avoid fraudulent or other financial improprieties. "Bob" first consumes financial services from Bank A where he performs identity verification and due diligence steps for KYC compliance. Later, "Bob" needs to consume financial services from Bank B as well. At this point, both "Bob" and Bank B want to know if "Bob" has already gone through such process and if so, they would like to re-use the identity assets created during the initial process. Additional details of this exemplary use case are presented below.

Note that the entity (e.g., Bank A) has invested a significant amount of resources (computer time, computer resources, electricity, personnel time, etc.) to create the identity asset 301. Nonetheless, since the identity asset 301 contains information about the user (Bob), the user has the right to request control over such an identity asset being held at different organizations/enterprises.

Previously, when the same individual(s) need to consume a similar service from another service provider, (e.g., consuming financial services in a different bank, joining another employer, applying for a visa in a different country, etc.), he/she is treated as a completely unrecognized person to the other service provider (i.e., he/she is a complete "stranger" to the other service provider), and is required to go through a similar verification/due diligence process again from the beginning with the second service provider. These repeated processes are expensive in terms of money, time, resources, etc. Since these lengthy processes are error-prone as well as time consuming, they also lead to frustrations and unsatisfactory user experiences.

Thus, one or more embodiments of the present invention present a process through which different service providers exchange aforementioned identity assets (the outcome of specialized identity verification and due diligence processes), in a decentralized manner (i.e., without involving a trusted central party), thus saving time and money, while also avoiding errors and frustrations. Specifically, one or more embodiments of the present invention optimize security and privacy provided by a blockchain environment when exchanging/sharing identity assets. Privacy of the user (i.e., protecting confidential information of the user, such as sensitive information about the user's identity and the transactions that the user performs) is to be protected whenever such an identity asset is exchanged. The present invention provides such an assurance through the novel use of a blockchain, which is described in detail below.

For explanatory purposes, Use Case 1 from table 202 is FIG. 2 will be used to describe the present invention. It is understood that other scenarios may also use the present invention.

Use Case 1: Bob first consumes financial services from bank A, where he performs identity verification and due diligence steps for KYC compliance. Later Bob needs to consume financial services from bank B as well. At this point, both Bob and bank B want to know if Bob has already gone through such a process and if so, they would like to re-use the identity assets created during the initial process.

In this Use Case 1, although Bob would like to re-use the identity asset created at bank A when interacting with bank B, Bob would not like to reveal to bank B which bank(s) Bob has interacted with before. In the same way, Bob would not like to reveal to bank A, which bank(s) Bob is planning to be a customer of. Bank A and bank B themselves would also not like to reveal their identities to each other during the identity asset exchange, due to business competition. Therefore, the anonymity of the parties who exchange the identity asset is a key privacy requirement. On the other hand, Bob would not like the transactions he carries out (with different banks based on the same identity asset) to be linkable by anyone except bank A, who is providing the identity asset. Therefore, unlinkability (i.e., the inability of associating one party to the transaction to another party to the transaction) of the transaction is another key privacy requirement that the improvements to the blockchain described herein achieve.

As just stated, a preferred embodiment of the present invention utilizes a blockchain. Exemplary blockchains are described now in FIGS. 4-8.

Figure 4:
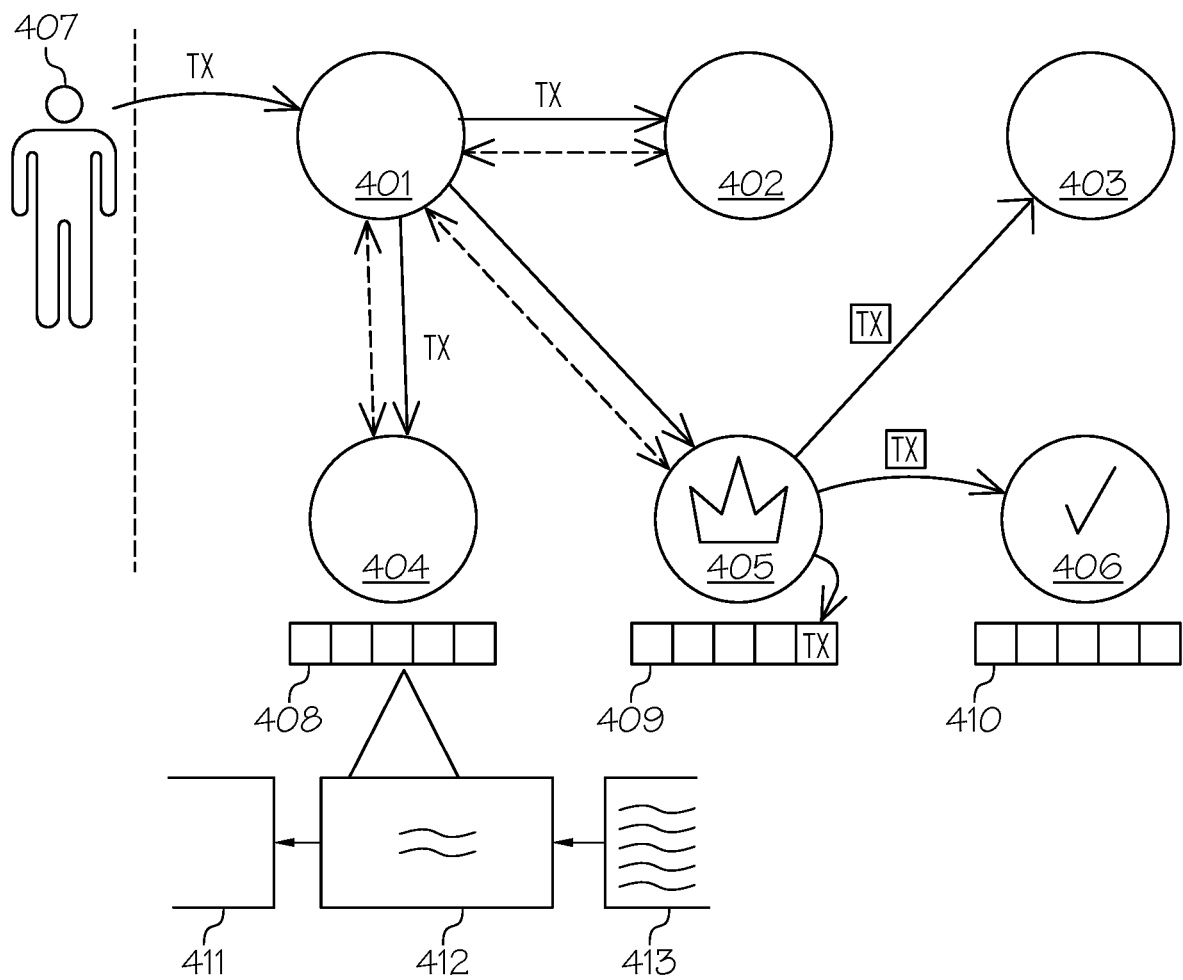
FIG. 4 depicts an exemplary blockchain architecture as used in one or more embodiments of the present invention.

With reference now to FIG. 4, an illustration of exemplary blockchains as used in one or more embodiments of the present invention is presented. As shown in FIG. 4, computers 401, 402, 403, 404, 405, and 406 represent an exemplary peer-to-peer network of devices used to support a peer blockchain (in which more or fewer computers/machines may form the peer-to-peer network of devices). Each of the computers 401, 402, 403, 404, 405 and 406 (which may be telecommunication devices, portable computers, servers, etc.) in the peer-to-peer network has a same copy of data (e.g., data that represents transaction events), as held in ledgers stored within the depicted blockchains 408, 409, 410 that are associated with respective computers 404, 405, 406.

As shown in FIG. 4, a client 407 (e.g., a computer) sends a transaction Tx (e.g., an event that occurred with the client 407) to the client's peer (depicted as computer 401). Computer 401 then sends the transaction Tx to ledgers known as the depicted blockchains 408, 409, 410 that are associated with other peers, including the depicted computers 402, 404, 405.

Blocks within exemplary blockchain 408 are depicted as block 411, block 412, and block 413. Block 413 is depicted as a newest entry into a ledger held in blockchain 408, and includes not only the newest transactions but also a hash of the data from the older block 412, which includes a hash of the even older block 411. Thus, older blocks are made even more secure each time a new block is created, due to the hashing operations.

As shown in FIG. 4, computer 405 has been designated as a leader peer according to a consensus model of the peer-to-peer network. In order to be designated as the leader peer, computer 405 has to be the first to "guess" what the data in Tx is. That is, computer 401 encrypted Tx with a known one-way encryption algorithm (e.g., Secure Hash Algorithm 2—"SHA-2"). Since this is a one-way encryption algorithm, there is no way to know what was used as the input by simply reverse-engineering the encryption. However, blockchain protocols require that the leading bits in the encrypted (hashed) data follow a certain pattern, such as eight leading zeros followed by other bits (e.g., "00000000xxxxxxxxxxxx"). Thus, computer 405 simply used brute force to input many combinations of data into the SHA-2 algorithm until an output of "00000000xxxxxxxxxxxx" is achieved. Since the first eight bits were correct ("00000000"), then there is an assumption that the other bits ("xxxxxxxxxxxx") are also correct, since the odds of getting "00000000" correct but not getting "xxxxxxxxxxxx" are extremely small. Note that while computer 405 is working on this problem (of guessing what the input data to the SHA-2 algorithm by computer 401 is), other computers such as computers 401-404 and 406 are also working on the problem.

Assume now that computer 405 won the "race" to decrypt Tx before computers 401-404 and 406. Thus, computer 405 will send the data ("00000000xxxxxxxxxxxx") in a newly-encrypted form (using a key provided by computer 401) to one or more of computers 401-404 and 406. One or more of computers 401-404 and 406 will then check computer 405's work. For example, assume that Tx described client 407, submitted a loan application in which he/she provided several identity attributes, including his/her age, employer, etc., as well as his/her address, which he/she gave as 123 Main Street, Anytown, USA. If the blockchain ledger shows that client 407 lives at 321 Main Street, Anothertown, USA, then one or more of the computers 401-404 and 406 will assume that computer 405 did not accurately decrypt Tx. However, if the blockchain ledger shows that client 407 lives at 123 Main Street, Anytown, USA, then one or more of the computers 401-404 and 406 will assume that computer 405 accurately decrypted Tx as containing information besides 123 Main Street, Anytown, USA. Once a predefined quantity of peer computers from computers 401-404 and 406 agree that the decrypted value of Tx is correct, then computer 405 will be designated as the leader peer for Tx, and will be compensated (e.g., in money) for its use of computing resources. That is, the nodes/computers that receive the new block/transaction (Tx) then attempt to validate the new block/transaction. If enough (i.e., some predefined quantity/percentage) of the nodes/computers validate the new block/transaction, then the new block/transaction is deemed valid for the entire peer-to-peer network of computers 401-406 and is added to the blockchains (including the depicted blockchains 408, 409, 410) associated with all of the nodes/peers/computers 401-406.

As such, the leader peer (computer 405) organizes all transactions from the nodes/peers/computers/telecommunication devices 401-406, and then shares new blocks/transactions (Tx) with other nodes (e.g., computers 403, 406) as depicted.

In one or more embodiments of the present invention, the blockchains (including the depicted blockchains 408, 409, 410) are "anchored" to a particular user by adding to the block/transaction information such as that shown in table 202 in FIG. 2 as well as the particular user's name ("Bob").

Figure 5:
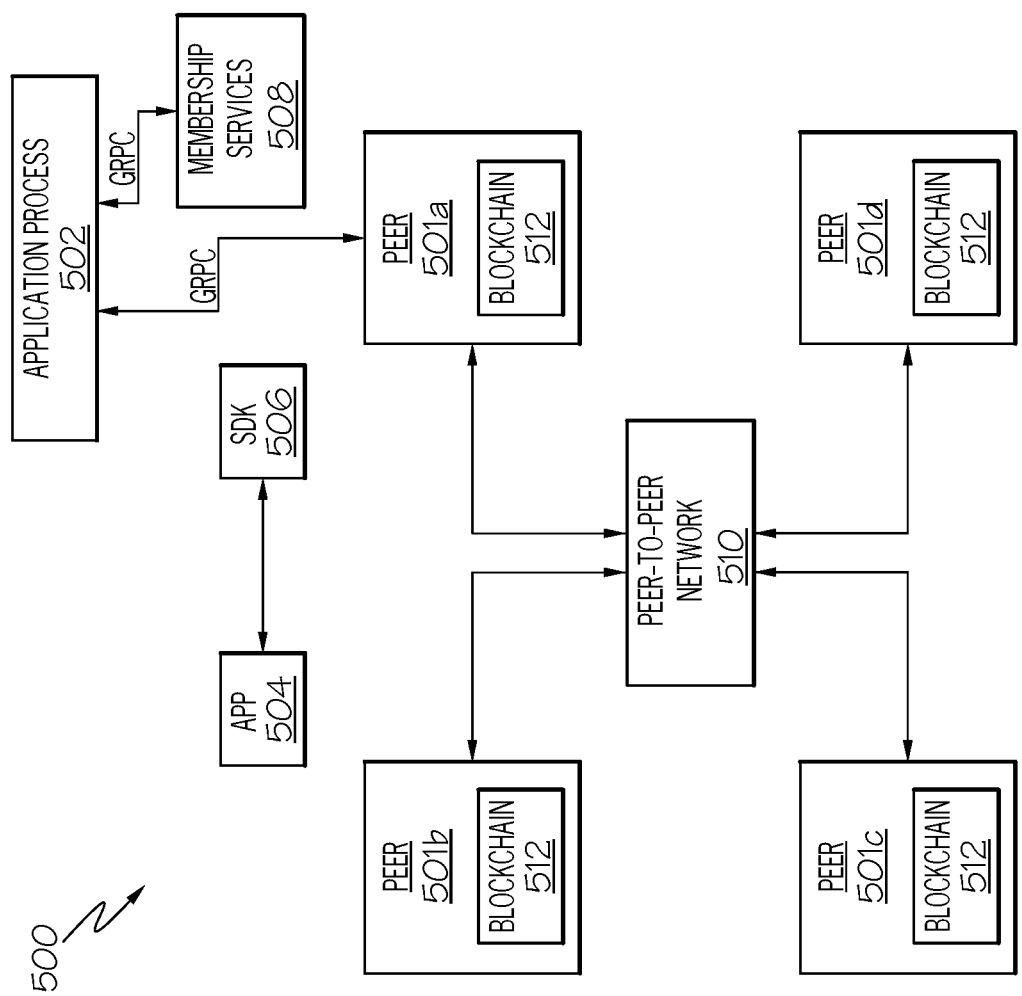
FIG. 5 illustrates additional detail of an exemplary blockchain topology as used in one or more embodiments of the present invention.
Figure 6:
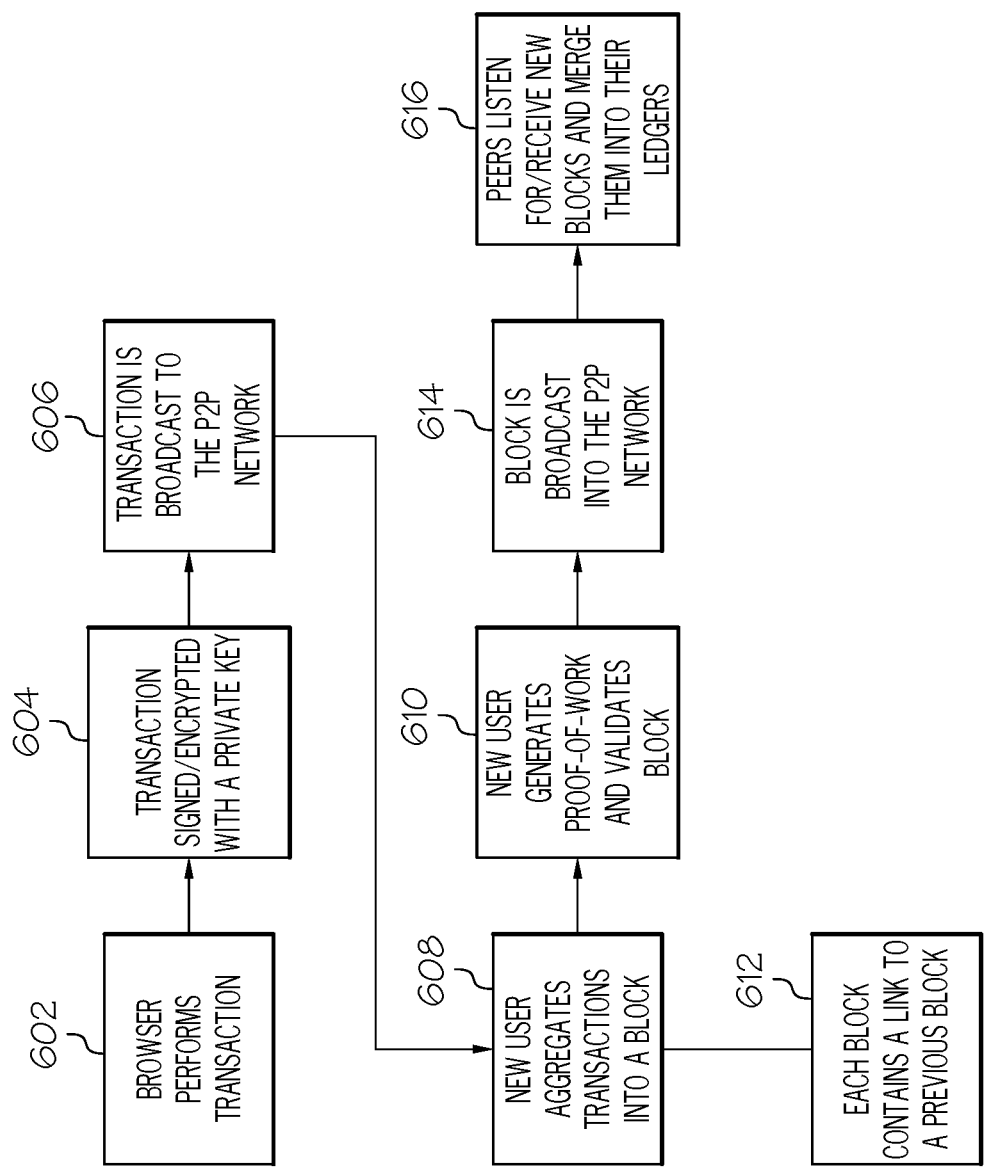
FIG. 6 depicts a high-level use of a blockchain in accordance with one or more embodiments of the present invention.

With reference now to FIGS. 5-6, additional detail of a blockchain and its operation as used by the present invention is presented.

In one or more embodiments of the present invention, a blockchain fabric, such as blockchain fabric 500 depicted in FIG. 5, is used to provide the infrastructure (e.g. execution of the chaincodes) and services (e.g., Membership services such as Identity management) for securely and transparently storing, tracking and managing transactions on a "single point of truth". The blockchain fabric 500 maintains a verifiable record (of the single point of truth) of every single transaction ever made within the system. Once data are entered onto the blockchain, they can never be erased (immutability) or changed. That is, a change to a record would be regarded as issuing/introducing a new transaction. Prohibition of such thus ensures auditability and verifiability of data.

The blockchain fabric 500 (also known as the "blockchain system", "open blockchain" or "hyperledger fabric") is based on a distributed database of records of all transactions or digital events that have been executed and shared among participating parties. An individual transaction in the blockchain is validated or verified through a consensus mechanism incorporating a majority of the participants in the system. This allows the participating entities to know for certain that a digital event happened by creating an irrefutable record in a permissioned public ledger.

When a transaction is executed, its corresponding chaincode is executed by several validating peers of the system. For example, as shown in FIG. 5, peers 501a-501d (i.e., other computers, servers, etc.) establish the validity of the transaction parameters and, once they reach consensus, a new block is generated and appended onto the blockchain network. That is, an application process 502 running on a client (e.g., client 407 shown in FIG. 4) executes an application such as the depicted App 504, causing a software development kit (SDK) 506 to communicate using general remote procedure calls (grpc) to membership services 508 that support the peer-to-peer network 510 that supports the blockchain 512 using the peers 501a-501d.

Exemplary operation of the open blockchain fabric 500 shown in FIG. 5 is presented in FIG. 6. As described in step 602, a browser (e.g., on client 407 shown in FIG. 4) performs a transaction (e.g., creating a new feature on an identity asset). As shown in step 604, the client signs and encrypts the transaction with a private key, such as SHA-2. This SHA-encrypted transaction is then broadcast to the peer-to-peer network 510, as described in step 606. A new user (e.g., peer 501c) aggregates the transaction(s) into blockchain 512, as shown in step 608. As shown in link 612, each block contains a link to a previous block. The newly-revised blockchain 512 is validated by one or more of the other peers in peers 501a-501d (step 610), and is then broadcast to the peers 501a-501b and peer 501d, as described in step 614. These peers 501a-501b and peer 501d listen for and receive the new blocks and merge them into their copies of blockchain 512 (step 616).

Thus, the open blockchain fabric 500 shown in FIG. 5 is a blockchain deployment topology that provides a distributed ledger, which persists and manages digital events, called transactions, shared among several participants, each having a stake in these events. The ledger can only be updated by consensus among the participants. Furthermore, once transactions are recorded, they can never be altered (they are immutable). Every such recorded transaction is cryptographically verifiable with proof of agreement from the participants, thus providing a robust provenance mechanism tracking their origination.

As such, a blockchain fabric uses a distributed network to maintain a digital ledger of events, thus providing excellent security for the digital ledger, since the blockchain stored in each peer is dependent upon earlier blocks, which provide encryption data for subsequent blocks in the blockchain.

That is, the open blockchain fabric 500 shown in FIG. 5 provides a decentralized system in which every node in a decentralized system has a copy of the blockchain. This avoids the need to have a centralized database managed by a trusted third party. Transactions are broadcast to the network using software applications. Network nodes can validate transactions, add them to their copy and then broadcast these additions to other nodes. However, as noted above, the blockchain is nonetheless highly secure, since each new block is protected (e.g., encrypted) based on one or more previous blocks.

In one or more embodiments of the present invention, a new and novel protocol for anonymous and unlinkable identity asset exchange through the use of a blockchain is provided. In this protocol, an identity asset provider (e.g., bank A) and the identity asset consumer (e.g., bank B) exchange the identity asset of the user anonymously, in a decentralized identity management platform backed by a blockchain network. Carrying out the identity asset exchange transactions over the decentralized and trusted identity platform backed by blockchain eliminates the requirement of a trusted third party. However, in this protocol alone, there could be threats to the ownership of the identity asset being exchanged, due to the anonymity of the parties involved. As such, the present invention defines the owners of the identity asset as both the user and the identity provider, although the identity asset is usually held at the identity provider. Thus, only the original owners of the identity asset are able to legitimately transfer the identity asset to an identity consumer.

The present invention thus provides an anonymous identity asset exchange protocol that is executed in a trusted identity platform backed by a permissioned blockchain network, such as a hyperledger-fabric.

Two assumptions related to the context in which this protocol is used are:

1) There is a standard format for an identity asset used for a particular identity verification scenario (e.g., KYC compliance verification in banks) that all parties agree on. Therefore, if multiple copies of a particular type of identity asset are created using the identity information of a given user by multiple parties, all of them would result in identical identity assets.

2) If a particular type of identity asset used for a particular identity verification scenario (e.g., KYC compliance verification in banks) is created by one identity provider (e.g., bank A), then other organizations who need to use such an identity asset of the user should re-use the already created identity asset, without re-creating it.

Figure 7:
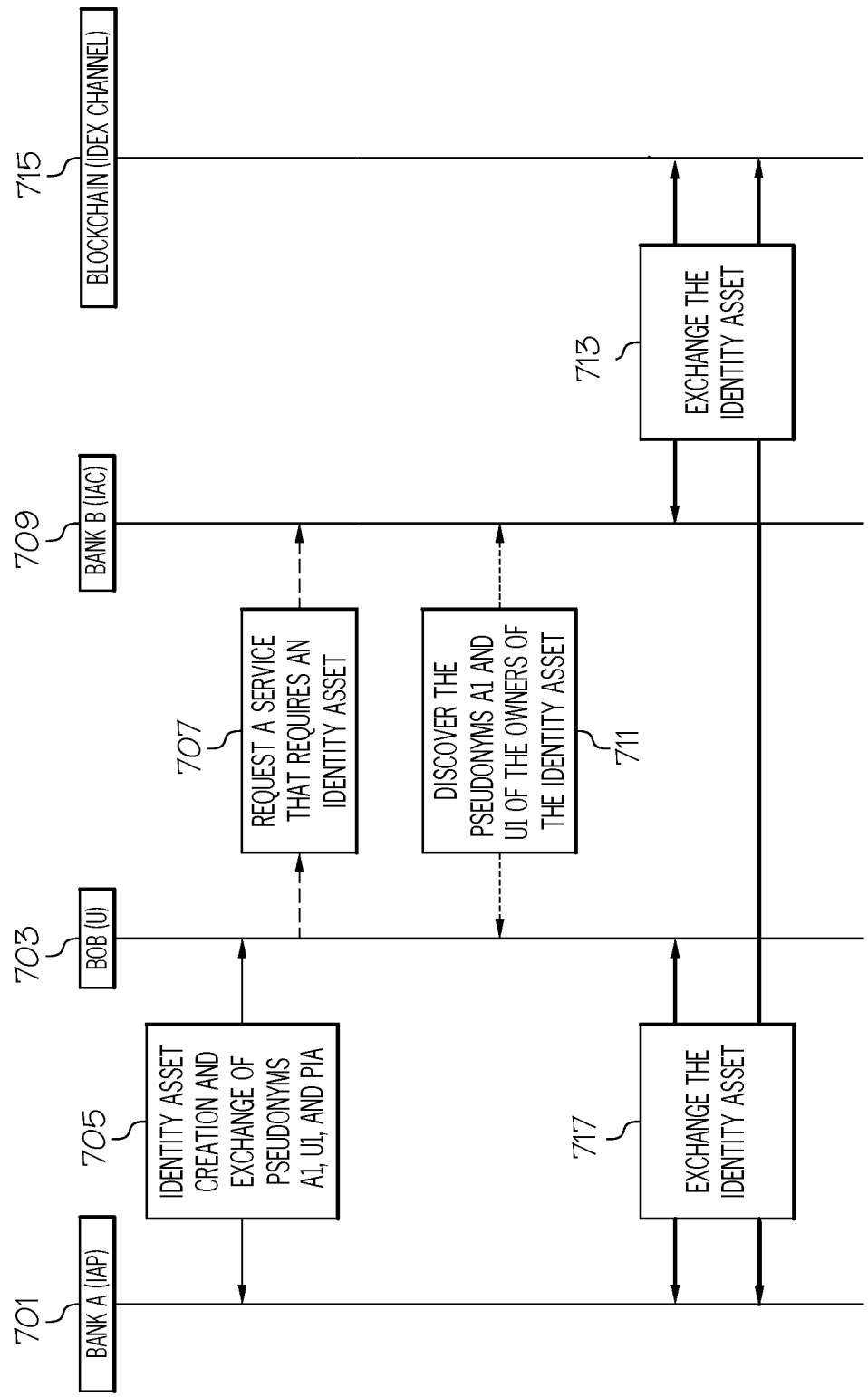
FIG. 7 illustrates a high-level overview of one or more embodiments of the present invention.

Thus, with reference now to FIG. 7, assume that Bank A is an identity asset producer (IAP), as shown in block 701. That is, Bank A has acquired enough attributes about an entity (e.g., "Bob") to build an identity (identity asset) about Bob (block 703), as shown in block 705. The information retrieved from and/or exchanged with Bob by Bank A include not only personal information about Bob (Bob's attributes), but also pseudonyms that identify Bank A (A1) and User Bob (U1), and (optionally) the pseudonym of the identity asset itself (PIA).

As shown in block 707, assume now that at a later time, Bob requests a service (e.g., a loan) from an entity other than Bank A (e.g., Bank B, shown in block 709). Bank B is a potential identity asset consumer (IAC) of the identity that was created earlier by Bank A. However, rather than simply asking Bank A for the identity asset of Bob (which would lead to security issues due to the lack of anonymity between Bank A and Bank B), an identity discovery phase (described in detail below) is executed between Bank B and Bob, as shown in block 711. This enables Bank B to learn the pseudonyms of the owners of the identity asset in order to initiate the anonymous identity asset exchange phase with the blockchain (block 715), as shown in block 713. Similarly, Bank A is able to retrieve the identity asset from the blockchain, and then send that identity asset (as retrieved from the blockchain) to Bob, as shown in block 717.

In one or more embodiments of the present invention, this transaction enters the blockchain via a state channel such as IDEX (an Ethereum-based decentralized exchange—DEX), which allows off-channel transactions to be configured before they are entered as a blockchain transaction to the peer computer 401 (and thus the leader peer computer 405 in the blockchain depicted in FIG. 4).

As just described, at least one embodiment of the present invention is related to securely sharing an identity of an entity (which may be a person, an enterprise, etc.). As defined herein, an "identity" is a collection of "attributes" about a particular entity.

Figure 8:
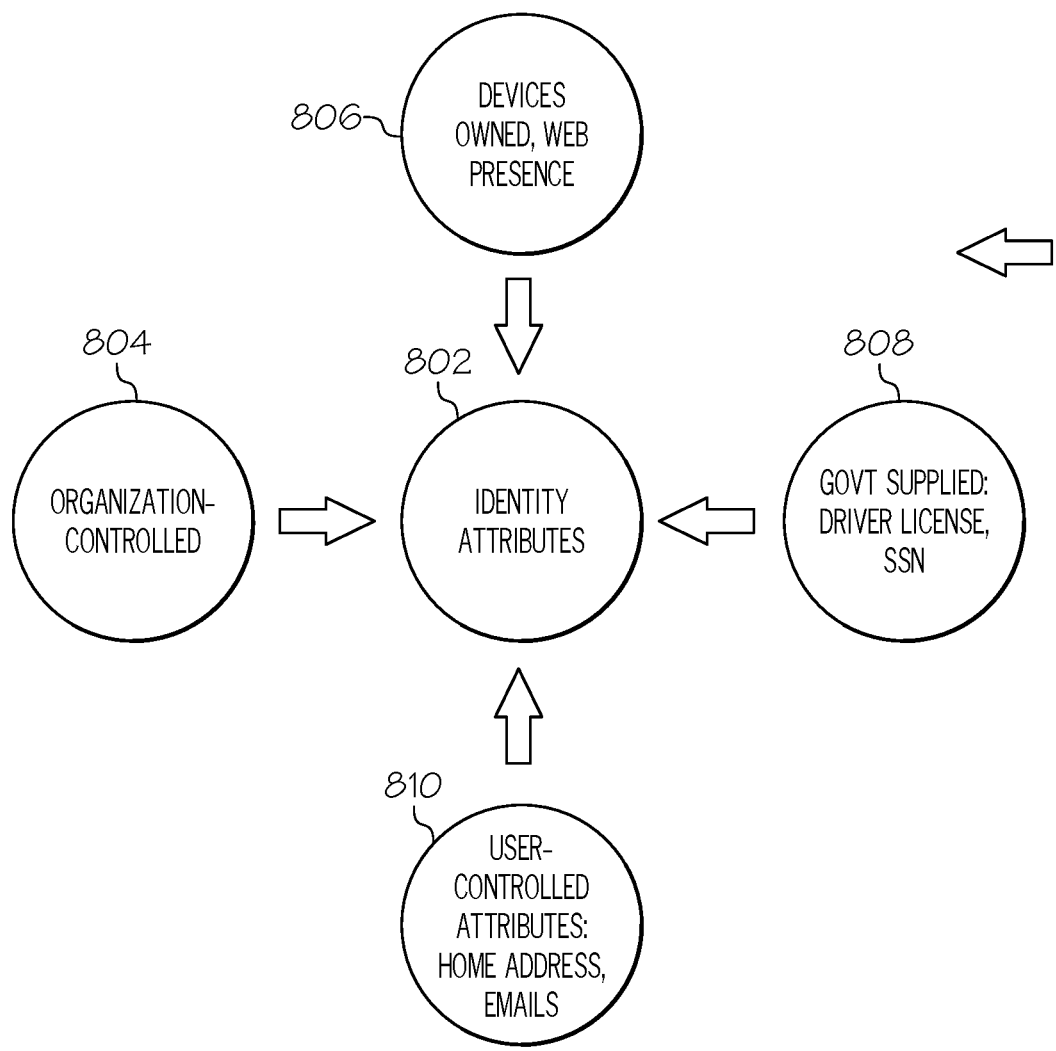
FIG. 8 depicts various sources of identity asset attributes in accordance with one or more embodiments of the present invention.

With reference now to FIG. 8, various identity attributes 802 of an identity of an entity are presented. As shown in FIG. 8 and in accordance with various embodiments of the present invention, identity attributes 802 come from organization-controlled sources 804 (e.g., an enterprise's personnel file database, a bank's customer account database, etc.); devices owned by and/or a web presence 806 of the entity (e.g., a particular entity is identified by a particular computer that he/she uses, which website he/she is currently viewing, etc.); government supplied data 808 (e.g., a driver's license number, a social security number, etc.); and/or a user-controlled data 810 (e.g., a home address of the entity/user, an email history for the entity/user, etc.).

That is and in one or more embodiments of the present invention, the organization-controlled sources 804 include data that is supplied by an employer, an entity verification service, a financial institute, etc., and provide identification information about a particular entity/person.

Devices owned by and/or a web presence 806 of the entity describe possessions of the entity/person (e.g., that he/she uses). Devices owned by and/or a web presence 806 of the entity also describe actions of the entity/person (e.g., the browsing history of the entity/person, an identity of a particular webpage that the entity/person is currently viewing, etc.), and thus provide identification information about a particular entity/person.

Government supplied data 808 are identifier attributes that are issued to a particular entity/person, such as a driver's license number, a social security number, etc., that provide identification information about a particular entity/person.

User-controlled data 810 is information that the user directly controls, such as where he/she lives, his/her email address, etc., that provides identification information about a particular entity/person.

Figure 9:
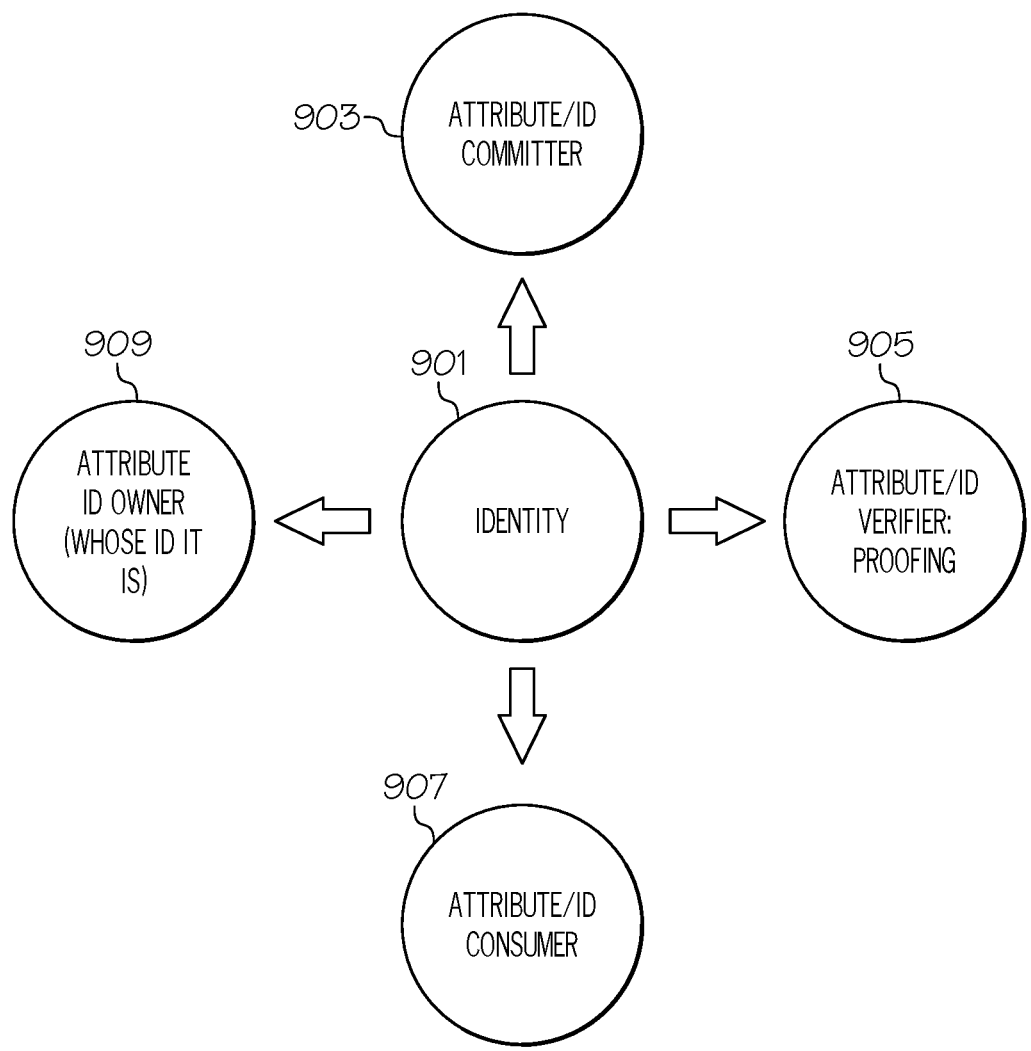
FIG. 9 illustrates various consumers of an identity asset (identity) in accordance with one or more embodiments of the present invention.

As shown in FIG. 9, various actors own or use the identity 901 (which is a collection of the identity attributes 802 shown in FIG. 8) of a particular entity/person. For example, an attribute/identifier committer 903 is an entity that commits (e.g., stores/commits to a blockchain) the identity's attributes and/or identifier. A proofing service 905 is an entity that verifies ("proofs") the identity of a particular person/entity, and thus uses information in the identity 901 (as derived by the elements shown in FIG. 8) when verifying/proofing the identity of a particular person/entity. Attribute/identity consumer 907 is a bank or other enterprise that is interested in verifying the identity of a particular existing or prospective customer. In one embodiment of the present invention, attribute identity owner 909 is the entity that is described by the identity 901. In another embodiment of the present invention, attribute identity owner 909 is an Internet of Things (IoT) device that is identified by identity 901.

Figure 10:
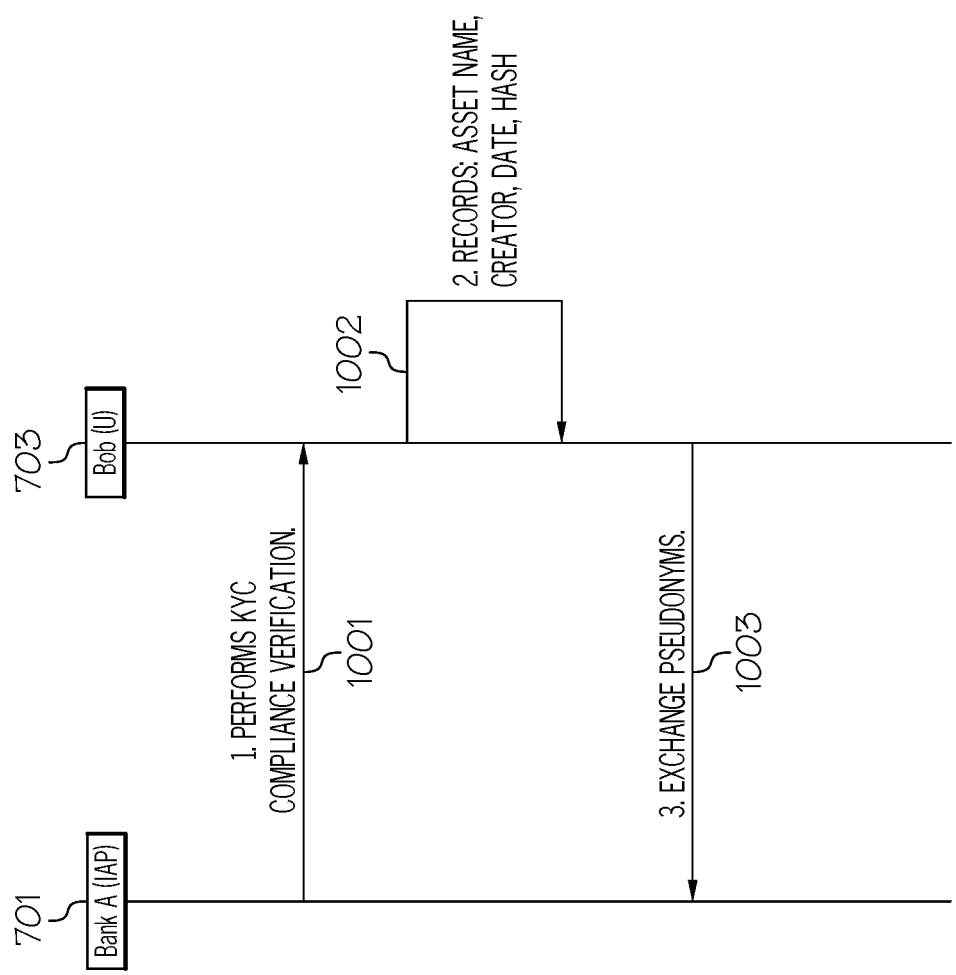
FIG. 10 depicts an identity asset creation in accordance with one or more embodiments of the present invention.

With regard now to FIG. 10, an overview of how an identity asset is created, in accordance with one or more embodiments of the present invention, is presented.

Assume that Bob (block 703 from FIG. 7) needs to consume financial services from Bank A (block 701 from FIG. 7). Bank A is required to perform know your customer (KYC) compliance verification for Bob, in which Bank A performs due diligence steps to ensure that "Bob" is who is says he is, as indicated by action 1001.

As such, Bob provides the required identity information and consent to perform background checks, to Bank A. Bank A verifies the identity of Bob, collects other information, and performs due diligence steps to verify the status of anti-money laundering (AML) compliance, combatting illicit funding compliance, and other compliance programs as they apply to customers such as Bob.

This process results in an identity asset stored at Bank A. Bob records a summary of the resulting identity asset, as indicated by action 1002, and Bank A and Bob then exchange pseudonyms to be used for future communication related to the identity asset, as indicated by action 1003.

Figure 11:
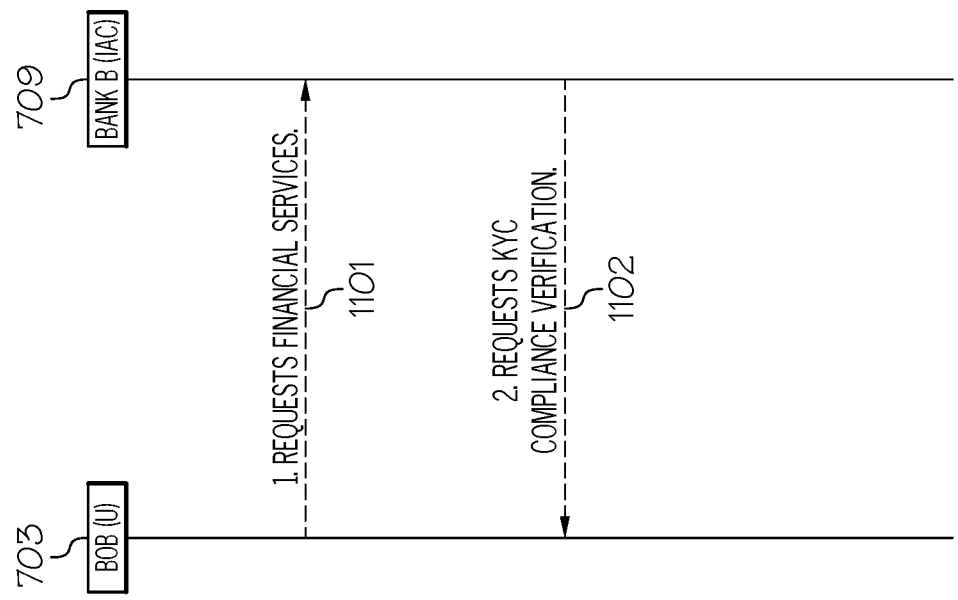
FIG. 11 illustrates an entity requesting a service that requires an identity asset.

With regard now to FIG. 11, an overview is presented on how an identity user (i.e., an entity that consumes the identity for its own use) requests an identity in accordance with one or more embodiments of the present invention.

As shown in action 1101, Bob needs and requests financial services from Bank B. In various embodiments of the present invention, these requested financial services are either the same or different financial services that were requested earlier from Bank A when Bob and Bank A created the identity for Bob. If Bank A purged the identity information about Bob after a certain amount of time (e.g., six months), or if Bank A failed to enter into a services agreement with Bob (e.g., a loan is denied), then Bank B and Bank A are a same bank in accordance with one or more embodiments of the present invention. However, in other embodiments of the present invention, Bank A and Bank B are different banks.

In either scenario, Bank B would like to use the KYC compliance verification that Bank A created for Bob. As such, Bank B asks Bob if he has gone through the KYC compliance verification process with another Bank A (or previously with Bank B, if Bank B has purged the KYC-compliant identity of Bob), as shown in action 1102. Thus, if both Bank B and Bob would like to reuse the previously generated KYC-compliant identity of Bob, then the process of identifying and retrieving the KYC-compliant identity of Bob is initiated, as shown in FIG. 12.

Figure 12:
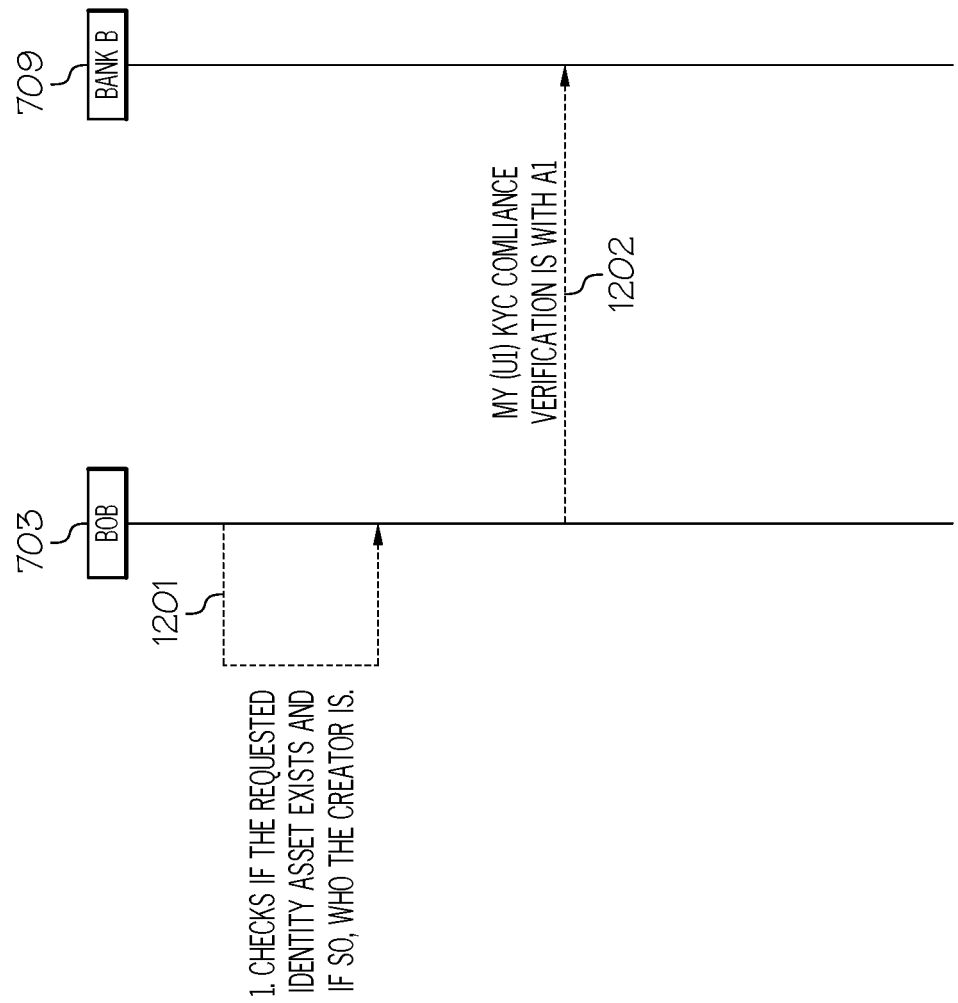
FIG. 12 depicts an identity asset discovery process in accordance with one or more embodiments of the present invention.

With reference then to FIG. 12, Bob checks his records to determine if the requested identity asset (for Bob) has been created before, as described in action 1201.

As described in action 1202, if Bob determines that an identity asset for Bob (e.g., a KYC-compliant identity of Bob) has been generated before (e.g., by Bank A), then pseudonyms that identify Bank A (A1) User Bob (U1), and the identity asset itself (PIA) are sent to Bank B.

Figure 13:
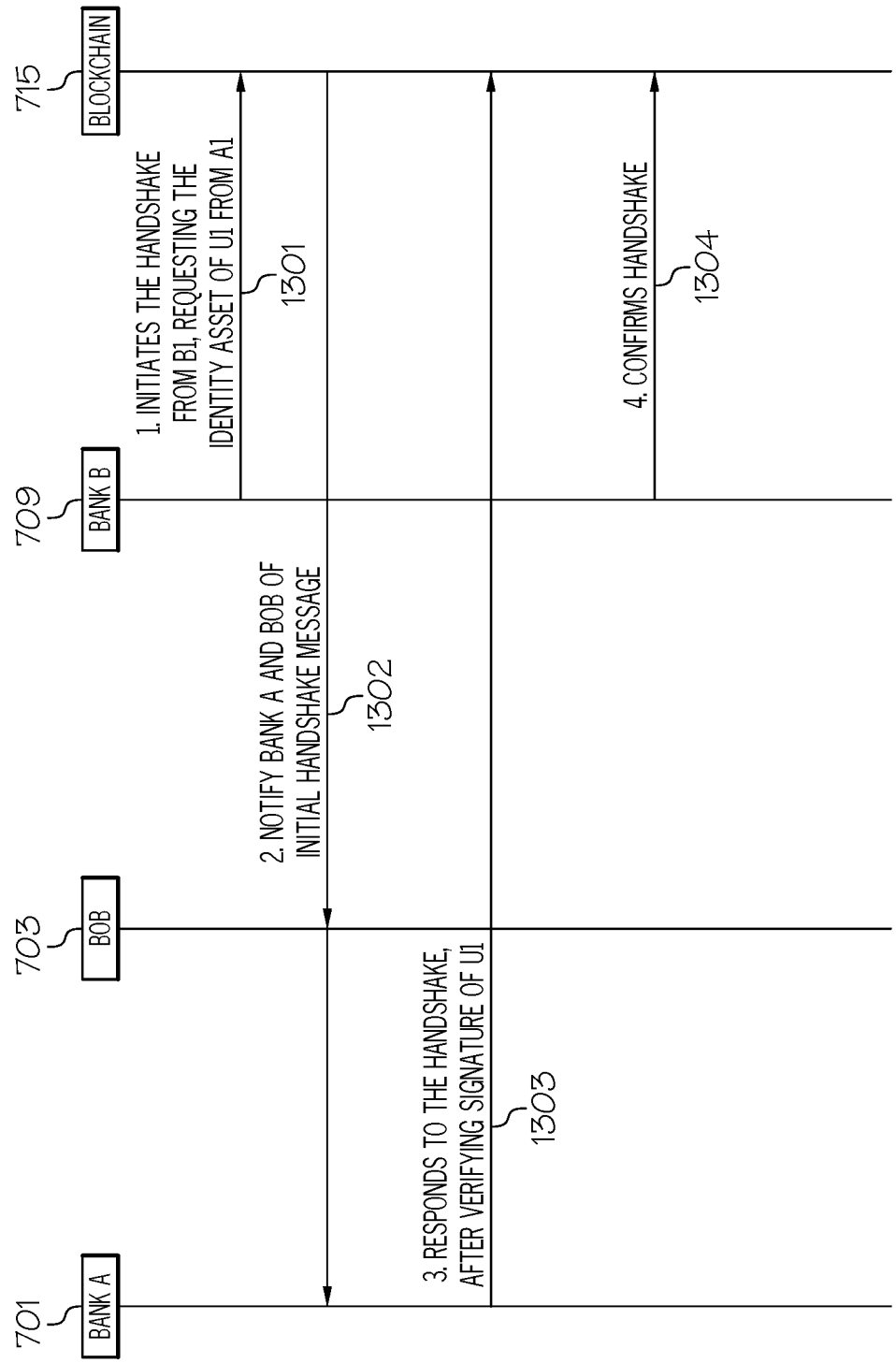
FIG. 13 illustrates a handshake phase of an identity asset exchange in accordance with one or more embodiments of the present invention.

With reference now to the handshake phase of the exchange identity asset and FIG. 13, Bank B then posts an initial handshake request to the blockchain requesting the identity (identity asset) for Bob, as shown in action 1301. This causes the blockchain to notify Bank A and Bob of the request, as shown in action 1302.

As shown in action 1303, Bank A, appearing as A1, posts a handshake response to the blockchain, after verifying that the request is signed by Bob (U1).

As shown in action 1304, Bank B, appearing as B1, posts a handshake confirmation to the blockchain. In various embodiments of the present invention, this handshake is used to agree on certain service level agreements (SLAs) related to the transaction.

Figure 14:
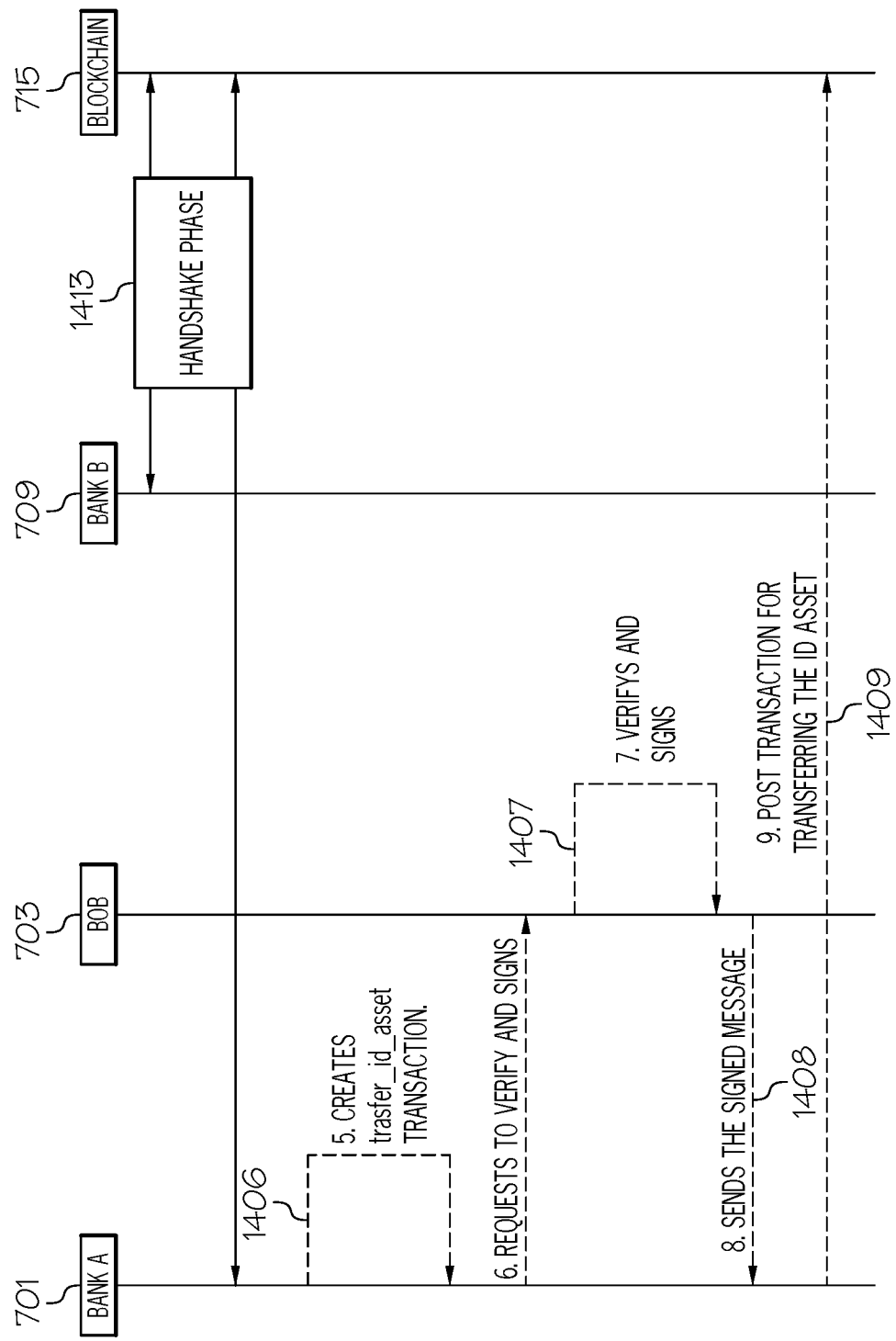
FIG. 14 depicts a transfer phase of an identity asset exchange in accordance with one or more embodiments of the present invention.

With reference now to the transfer phase of the identity asset exchange and FIG. 14, the handshake phase described in FIG. 13 is depicted in block 1413 and the arrows associated with block 1413.

As shown in action 1405, Bank A, appearing as A1, creates the transaction transfer_id_asset (depicted in FIG. 4 as the TX going to peer computer 401). This transaction includes the identity asset encrypted with B1's (Bob's) public key, which is used to sign and send for Bob's signature. Thus, as shown in action 1406, Bank A requests that Bob verify and sign the transaction transfer_id_asset, indicating that he authorizes Bank A to obtain his identity asset. This authorization and signature by Bob is shown in action 1407. Bob (acting as U1) then sends the signed authorization back to Bank A (acting as A1), as shown in action 1408. Bank A, appearing as A1, then posts the transaction transfer_id_asset to the blockchain, as shown in action 1409, directing the blockchain to retrieve and return the identity asset of Bob.

Figure 15:
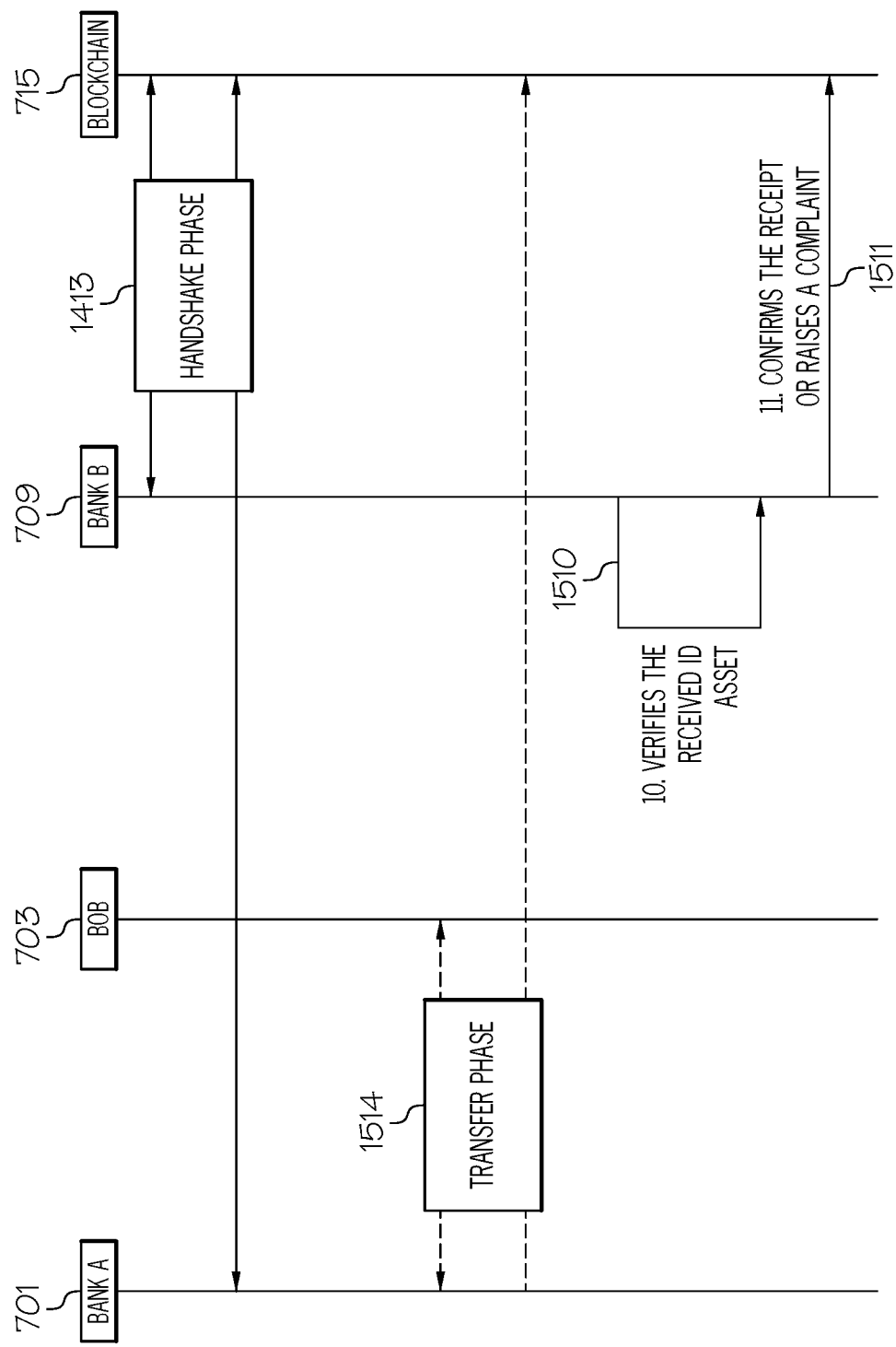
FIG. 15 illustrates a confirmation phase of an identity asset exchange in accordance with one or more embodiments of the present invention.

With reference now to the confirmation phase of the identity asset exchange and FIG. 15, the handshake phase described in FIG. 13 is shown in block 1413 and the transfer phase described in FIG. 14 is shown in block 1514.

With reference now to action 1510, Bank B, appearing as B1, verifies the information in the transaction transfer_id_asset. That is, Bank B verifies that the hash of the identity asset provided by the user Bob (U1) at the discovery phase (described in FIG. 12) matches that of the encrypted identity asset and other details. If the verification is successful, the Bank B (B1) posts an acknowledgement to the blockchain to confirm the receipt of the identity asset, as shown in action 1511. However, as also shown in action 1511, if the verification is unsuccessful, then Bank B (B1) posts a complaint to the blockchain about the transfer_id_asset transaction, and works with an auditor (e.g., one of the resource peer computers within the blockchain that handles complaints) and Bank A (A1) to resolve the dispute. The auditor then posts its decision of the dispute resolution to the blockchain. That is, in an embodiment of the present invention, one of the peer computers within the blockchain handles the dispute, and issues another transaction TX (see FIGS. 3-4) to the other peer computers letting them know of the dispute via a revised ledger (e.g., block 412) how the dispute is resolved (e.g., the identity asset is amended to accurately depict what was generated by Bank A and sent as an initial transaction to the blockchain via the IDEX channel discussed above.

Figure 16:
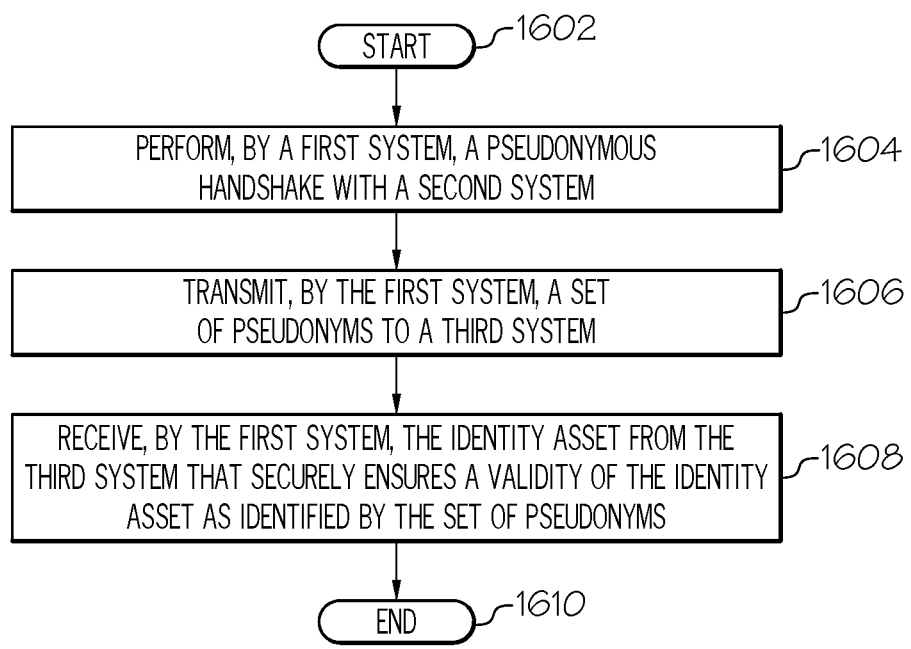
FIG. 16 is a high-level flow-chart of one or more steps performed in a processor-based method in accordance with one or more embodiments of the present invention.

With reference now to FIG. 16, a high-level flow chart of one or more processes performed by one or more processors (and/or other hardware devices) in accordance with one or more embodiments of the present invention is presented.

After initiator block 1602, a first system (e.g., Bank B shown in FIG. 7) performs a pseudonymous handshake with a second system (e.g., Bank A shown in FIG. 7), as described in block 1604. This handshake is pseudonymous since Bank B does not know who Bank A is, but can nonetheless communicate with Bank A using Bank A's pseudonym. As described herein, the second system (e.g., Bank A) has created an identity asset (i.e., a collection of identity attributes) that identifies an entity (e.g., "Bob" shown in FIG. 7). As described herein, the second system has also transmitted the identity asset to a third system (e.g., the blockchain shown in FIG. 7), which is a set of peer computers that support a blockchain that securely maintains a ledger of the identity asset (see FIGS. 4-6).

As described in block 1606 in FIG. 16, the first system transmits a set of pseudonyms to the third system. This set of pseudonyms includes, but is not limited to, a first pseudonym that identifies the first system, a second pseudonym that identifies a user of the second system, and a third pseudonym that identifies the third system.

As described in block 1608, the first system then receives the identity asset from the third system. As described herein, securely ensures a validity of the identity asset as identified by the first pseudonym, the second pseudonym, and the third pseudonym.

The flow chart ends at terminator block 1610.

In an embodiment of the present invention, in response to receiving the identity asset from the third system, the first system (or alternatively, some other system) provides a service to the entity, wherein the identity asset is a prerequisite for providing the service. For example, if the first system is a bank, then that bank provides a loan to the entity Bob upon receiving Bob's identity asset from the blockchain.

In an embodiment of the present invention, the service provided to the entity (in response to receiving the identity asset from the third system) includes activating a communication channel that enables the first system to access a set of predetermined hardware resources to be used while providing the service to the entity. That is, without the identity asset, the communication channel cannot be activated. However, once the first system acquires the identity asset, it can use that identity asset to activate a communication channel (e.g., a subchannel within network 127 shown in FIG. 1) to access a second computer 153, which may provide access to a database that is stored within the second computer 153 for the first system to use when providing its service to the entity Bob, etc.

As described above, in one or more embodiments of the present invention the third system (i.e., the blockchain system) secures the identity asset through use of a public key provided by the third system. That is, the ledger in the block that has the identity asset (e.g., block 412 shown in FIG. 4) is encrypted using a public key that is provided by one or more of the peer computers shown in FIG. 4.

In an embodiment of the present invention, the pseudonymous handshake between the first system and the second system is performed in response to a conclusion of said second system creating the identity asset. That is, after the second system (e.g., Bank A) creates the identity asset that identifies the entity Bob, the first system (Bank B) and the second system (Bank A) initiate the pseudonymous handshake that will lead to Bank B acquiring the identity asset for Bob.

In an embodiment of the present invention, the set of pseudonyms is created by the pseudonymous handshake between the first system and the second system. That is, the set of pseudonyms is created as part of the pseudonymous handshake between the first system and the second system.

In an embodiment of the present invention, a first user of the first system, a second user of the second system, and the entity are all anonymous to other parties. Thus, the identity asset is unable to be accessed by any third party, due to the processes described herein.

Thus, the present invention provides an improvement over the prior art in exchanging and reusing identity assets by providing a novel protocol for anonymous exchange of identity assets that supports identity asset producer (IAP) anonymity, identity asset consumer (IAC) anonymity, and full anonymity of all parties, including the user who is described by the identity asset. As described herein, the present invention provides a new and useful method for pseudonymous handshakes over a blockchain, thus leading to an assurance of consent by the owners of the identity asset on the exchange, a process for dispute resolution regarding the features of the identity asset using a permissioned blockchain, and/or a method for unlinkability of multiple identity asset exchange transactions.

In one or more embodiments, the present invention is implemented using cloud computing. Nonetheless, it is understood in advance that although this disclosure includes a detailed description on cloud computing, implementation of the teachings recited herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model includes at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but still is able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. In one or more embodiments, it is managed by the organization or a third party and/or exists on-premises or off-premises.

Community cloud: the cloud infrastructure is shared by several organizations and supports a specific community that has shared concerns (e.g., mission, security requirements, policy, and compliance considerations). In one or more embodiments, it is managed by the organizations or a third party and/or exists on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 17:
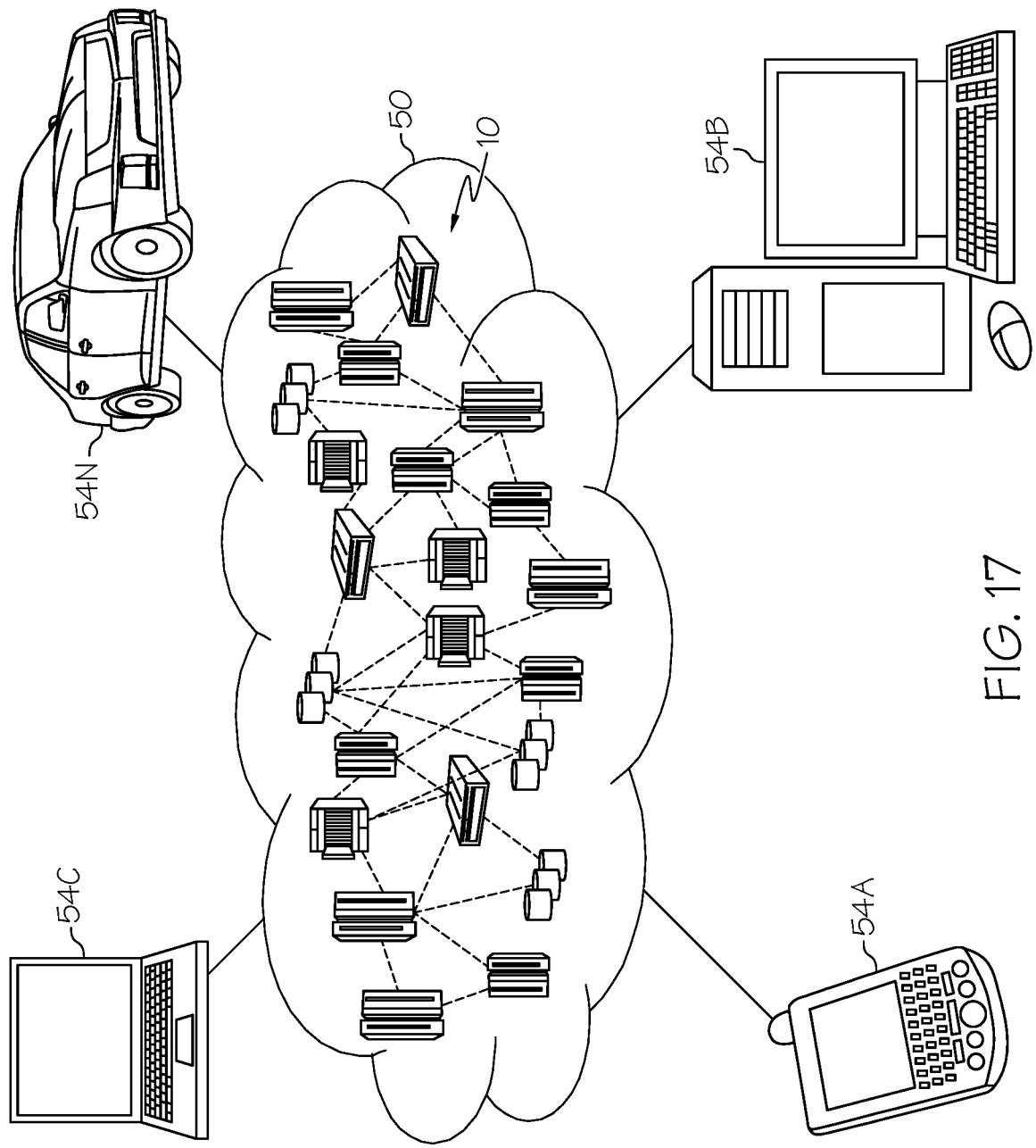
FIG. 17 depicts a cloud computing environment according to an embodiment of the present invention.

Referring now to FIG. 17, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N communicate with one another. Furthermore, nodes 10 communicate with one another. In one embodiment, these nodes are grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-54N shown in FIG. 17 are intended to be illustrative only and that computing nodes 10 and cloud computing environment 50 can communicate with any type of computerized device over any type of network and/or network addressable connection (e.g., using a web browser).

Figure 18:
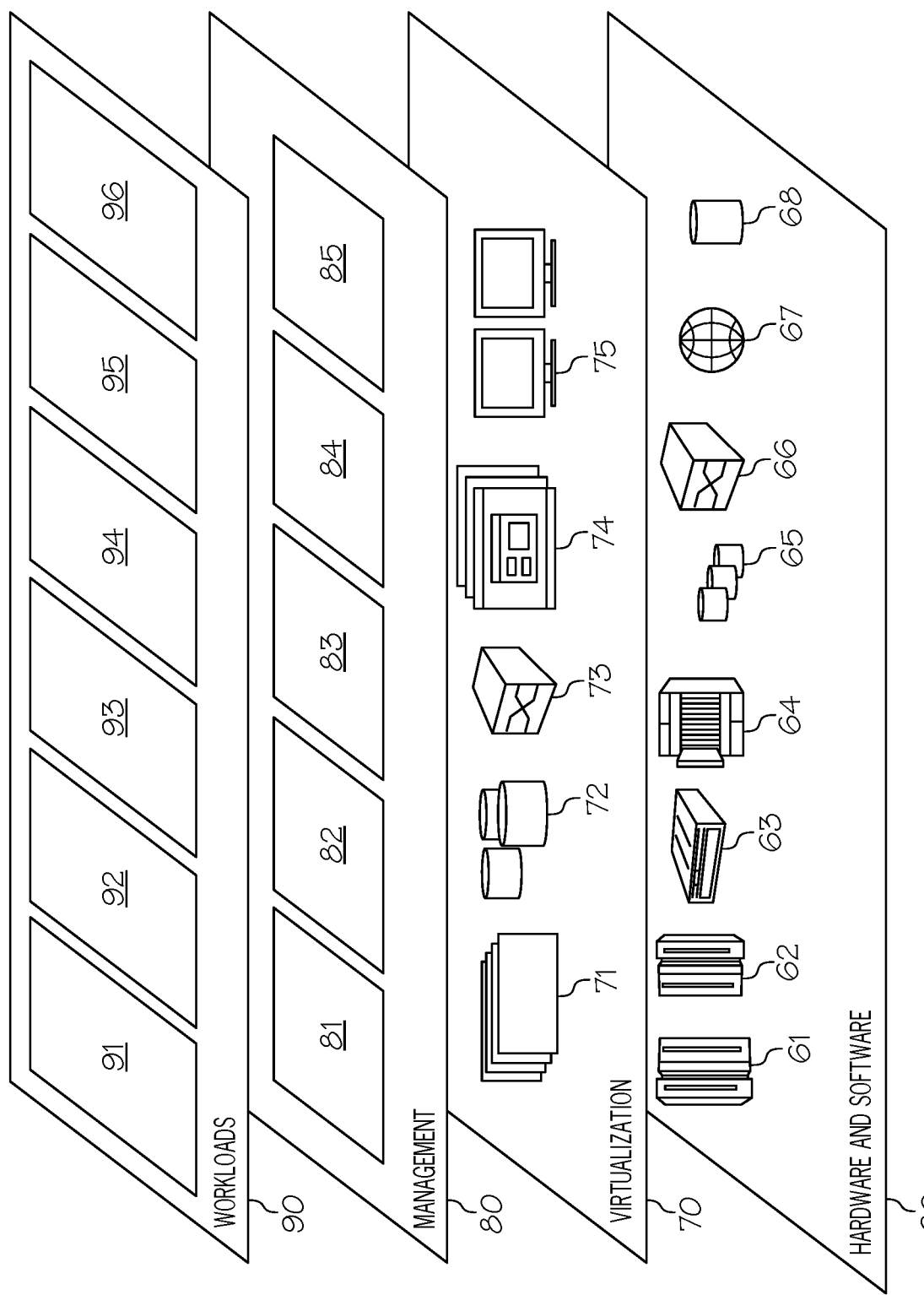
FIG. 18 depicts abstraction model layers of a cloud computer environment according to an embodiment of the present invention.

Referring now to FIG. 18, a set of functional abstraction layers provided by cloud computing environment 50 (FIG. 17) is shown. It should be understood in advance that the components, layers, and functions shown in FIG. 18 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities that are provided in one or more embodiments: virtual servers 71; virtual storage 72; virtual networks 73, including virtual private networks; virtual applications and operating systems 74; and virtual clients 75.

In one example, management layer 80 provides the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment are utilized in one or more embodiments. Examples of workloads and functions which are provided from this layer include: mapping and navigation 91; software development and lifecycle management 92; virtual classroom education delivery 93; data analytics processing 94; transaction processing 95; and identity asset exchange processing 96, which performs one or more of the features of the present invention described herein.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

In one or more embodiments of the present invention, any methods described in the present disclosure are implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, in one or more embodiments of the present invention any software-implemented method described herein is emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A processor-implemented method of facilitating identity exchange in a decentralized setting, wherein the processor-implemented method comprises:
   performing, by a first system, a pseudonymous handshake directly with a second system, wherein the first system contacts the second system by contacting a fourth pseudonym that is anonymously used by the second system, wherein the second system has created an identity asset that includes a collection of multiple identity attributes of an entity, wherein the second system has transmitted the identity asset to a third system, and wherein the third system is a set of peer computers that support a blockchain that securely maintains a ledger of the identity asset;
   transmitting, by the first system, a set of pseudonyms to the third system, wherein the set of pseudonyms comprises a first pseudonym that identifies the first system, a second pseudonym that identifies a user of the second system, and a third pseudonym that identifies the third system; and
   receiving, by the first system, the identity asset from the third system, wherein the third system securely ensures a validity of the identity asset as identified by the first pseudonym, the second pseudonym, and the third pseudonym.

2. The processor-implemented method of claim 1, further comprising:
   in response to receiving the identity asset from the third system, providing, by the first system, a service to the entity, wherein the identity asset is a prerequisite for providing the service.

3. The processor-implemented method of claim 2, further comprising:
   in response to receiving the identity asset from the third system, activating a communication channel that enables the first system to access a set of predetermined hardware resources to be used while providing the service to the entity.

4. The processor-implemented method of claim 1, wherein the third system secures the identity asset through use of a public key provided by the third system.

5. The processor-implemented method of claim 1, wherein the pseudonymous handshake between the first system and the second system is performed in response to a conclusion of said second system creating the identity asset.

6. The processor-implemented method of claim 1, wherein the set of pseudonyms is created by the pseudonymous handshake between the first system and the second system.

7. The processor-implemented method of claim 1, wherein a first user of the first system, the user of the second system, and the entity are all anonymous to other parties.

8. A computer program product for facilitating identity exchange in a decentralized setting with full anonymity, wherein the computer program product comprises a non-transitory computer readable storage device having program instructions embodied therewith, the program instructions readable and executable by a computer to perform a method comprising:
   performing, by a first system, a pseudonymous handshake with a second system, wherein the second system has created an identity asset that identifies an entity, wherein the second system has transmitted the identity asset to a third system, and wherein the third system is a set of peer computers that support a blockchain that securely maintains a ledger of the identity asset;
   transmitting, by the first system, a set of pseudonyms to the third system, wherein the set of pseudonyms comprises a first pseudonym that identifies the first system, a second pseudonym that identifies a user of the second system, and a third pseudonym that identifies the third system; and
   receiving, by the first system, the identity asset from the third system, wherein the third system securely ensures a validity of the identity asset as identified by the first pseudonym, the second pseudonym, and the third pseudonym.

9. The computer program product of claim 8, wherein the method further comprises:
   in response to receiving the identity asset from the third system, providing a service to the entity, wherein the identity asset is a prerequisite for providing the service.

10. The computer program product of claim 9, wherein the method further comprises:
    in response to receiving the identity asset from the third system, activating a communication channel that enables the first system to access a set of predetermined hardware resources to be used while providing the service to the entity.

11. The computer program product of claim 8, wherein the third system secures the identity asset through use of a public key provided by the third system.

12. The computer program product of claim 8, wherein the pseudonymous handshake between the first system and the second system is performed in response to a conclusion of said second system creating the identity asset.

13. The computer program product of claim 8, wherein the set of pseudonyms is created by the pseudonymous handshake between the first system and the second system.

14. The computer program product of claim 8, wherein a first user of the first system, the user of the second system, and the entity are all anonymous to other parties.

15. The computer program product of claim 8, wherein the program instructions are provided as a service in a cloud environment.

16. A computer system comprising one or more processors, one or more computer readable memories, and one or more computer readable non-transitory storage mediums, and program instructions stored on at least one of the one or more computer readable non-transitory storage mediums for execution by at least one of the one or more processors via at least one of the one or more computer readable memories, the stored program instructions executed to perform a method comprising:
   performing, by a first system, a pseudonymous handshake with a second system, wherein the second system has created an identity asset that identifies an entity, wherein the second system has transmitted the identity asset to a third system, and wherein the third system is a set of peer computers that support a blockchain that securely maintains a ledger of the identity asset;
   transmitting, by the first system, a set of pseudonyms to the third system, wherein the set of pseudonyms comprises a first pseudonym that identities the first system, a second pseudonym that identifies a user of the second system, and a third pseudonym that identifies the third system; and
   receiving, by the first system, the identity asset from the third system, wherein the third system securely ensures a validity of the identity asset as identified by the first pseudonym, the second pseudonym, and the third pseudonym.

17. The computer system of claim 16, wherein the method further comprises:

in response to receiving the identity asset from the third system, providing a service to the entity, wherein the identity asset is a prerequisite for providing the service.

18. The computer system of claim 17, wherein the method further comprises:

in response to receiving the identity asset from the third system, activating a communication channel that enables the first system to access a set of predetermined hardware resources to be used while providing the service to the entity.

19. The computer system of claim 16, wherein the pseudonymous handshake between the first system and the second system is performed in response to a conclusion of said second system creating the identity asset.

20. The computer system of claim 16, wherein a first user of the first system, the user of the second system, and the entity are all anonymous to other parties.

* * * * *